United States Patent Office.

ADOLF BAEYER, OF MUNICH, BAVARIA, AND HEINRICH CARO, OF MANNHEIM, BADEN, GERMANY, ASSIGNORS TO THE BADISCHE ANILIN AND SODA FABRIK, OF MANNHEIM, BADEN, GERMANY.

MANUFACTURE OF ARTIFICIAL INDIGO.

SPECIFICATION forming part of Letters Patent No. 240,359, dated April 19, 1881.

Application filed February 15, 1881. (Specimens.)

*To all whom it may concern:*

Be it known that we, ADOLF BAEYER, a subject of the King of Bavaria, and HEINRICH CARO, a subject of the Grand Duke of Baden, residing, the former at Munich, in the Kingdom of Bavaria, the latter at Mannheim, in the Grand Duchy of Baden, Empire of Germany, have invented new and useful Improvements in the Manufacture of Dye-Stuffs or Coloring-Matters, of which a specification is set forth below.

This invention relates to the production of blue coloring-matters or dye-stuffs from orthonitrophenylpropiolic acid. The said coloring-matters belong to the class of so-called "artificial indigo" which is produced, according to the specification in Letters Patent No. 227,470, dated May 11, 1880, by the action of alkalies and deoxidizing agents upon orthonitrophenylpropiolic acid. The said coloring-matters are capable of replacing vegetable indigo or similar dye-stuffs in some of their industrial applications.

Now, we have discovered that the deoxidation of orthonitrophenylpropiolic acid may also be effected by the action of sulpho-carbonates, and of the latter class of sulphur compounds we have found that with the aid of alkaline xanthates good results are obtained.

In carrying out this invention we proceed as follows: We take about ten parts, by weight, of orthonitrophenylpropiolic acid and add about four parts, by weight, of carbonate of potash, or as much of a caustic or carbonated alkali as is required to convert the said acid into its alkaline compounds. We then add about fifteen parts, by weight, of xanthate of soda, and mix the whole intimately, with the addition of as much cold water as is required to form a paste. We then allow the mixture to stand at a moderate temperature, when it gradually dries up and turns blue. The reaction is finished when the blue color no longer increases in intensity, or when no more unconverted orthonitrophenylpropiolic acid can be detected in the dark-blue product thus obtained. This product contains, in addition to coloring-matters, soluble salts and compounds, and also free sulphur. The soluble salts and compounds are eliminated by repeated washings with water. The residue remaining constitutes the dye-stuff or coloring-matter. It is used in the dye-bath in the same manner as the artificial indigo described in Patent No. 227,470, and it can be distinguished from vegetable indigo and from the artificial indigo described in said Patent No. 227,470 by the presence of free sulphur.

Having used the term "orthonitrophenylpropiolic acid" in this specification, we wish it to be understood that we do not intend to designate thereby a chemically pure substance bearing that name in scientific language, but we intend to designate therewith a manufactured commercial product.

What we claim as new, and desire to secure by Letters Patent, is—

1. As a new article of manufacture, the blue dye-stuff or coloring-matter having the properties above stated.

2. The within-described process for producing dye-stuffs or coloring-matters by the deoxidizing action of an alkaline xanthate upon an alkaline compound of orthonitrophenylpropiolic acid, substantially as above described.

In testimony whereof we have hereunto set our hands in the presence of two subscribing witnesses.

ADOLF BAEYER.
    HEINRICH CARO.

Witnesses as to Adolf Baeyer:
 PAUL FRIEDLAENDER,
 WILHELM HAUSSMANN.

Witnesses as to Heinrich Caro:
 WM. PICKHARDT,
 J. DUGELNOR.